(12) United States Patent
Loe

(10) Patent No.: US 11,050,462 B2
(45) Date of Patent: Jun. 29, 2021

(54) COMBINED RFID AND POWER MANAGEMENT ARCHITECTURE

(71) Applicant: Silicon Laboratories Inc., Austin, TX (US)

(72) Inventor: Oeivind Aleksander G. Loe, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 123 days.

(21) Appl. No.: 16/021,402

(22) Filed: Jun. 28, 2018

(65) Prior Publication Data

US 2020/0007192 A1    Jan. 2, 2020

(51) Int. Cl.
*H04B 5/00* (2006.01)
*H02J 7/00* (2006.01)

(52) U.S. Cl.
CPC .......... *H04B 5/0037* (2013.01); *H02J 7/0068* (2013.01)

(58) Field of Classification Search
CPC .. H02J 50/20; H02J 50/40; H02J 50/10; H02J 50/12; H02J 7/025; H02J 7/02; H04B 5/00; H04B 5/0037; H04B 5/0056; H04W 52/02; H04W 4/00; H04W 4/008
USPC ....................... 307/19, 64, 66, 82, 21, 38, 43
See application file for complete search history.

(56) References Cited

U.S. PATENT DOCUMENTS

2011/0127845 A1* 6/2011 Walley ................ H02J 7/00034
307/104
2012/0187897 A1* 7/2012 Lenk ..................... H01M 10/46
320/101
2015/0130281 A1* 5/2015 Sabripour ............... H02J 3/381
307/66
2017/0005703 A1* 1/2017 Junk ........................ G01D 9/00
2018/0183256 A1* 6/2018 Tanaka ............... G06K 19/0708

OTHER PUBLICATIONS

De Donno, D., et al., "An UHF RFID Energy-Harvesting System Enhanced by a DC-DC Charge Pump in Silicon-on-Insulator Technology," IEEE Microwave and Wireless Components Letters, vol. 23, No. 6, Jun. 2013, pp. 315-317.

* cited by examiner

*Primary Examiner* — Nguyen Tran
*Assistant Examiner* — Jagdeep S Dhillon
(74) *Attorney, Agent, or Firm* — Zagorin Cave LLP

(57) ABSTRACT

An integrated circuit includes an integrated circuit interface, a wireless communications circuit, a selection circuit, and a control circuit. The integrated circuit interface includes a plurality of power supply input terminals, a plurality of power delivery terminals, and an energy harvest output terminal. The wireless communications circuit is configured to harvest energy received in a wireless communications signal and to provide harvested energy to the energy harvest output terminal. The selection circuit is coupled to the integrated circuit interface and is configured to selectively provide power to the plurality of power delivery terminals based on power received from the plurality of power supply input terminals in response to a control signal. The control circuit is configured to generate the control signal based on a first level of the harvested energy, any signals received on the plurality of power supply input terminals, and predetermined rules.

19 Claims, 3 Drawing Sheets

COMBINED RFID AND POWER MANAGEMENT ARCHITECTURE

BACKGROUND

Field of the Invention

This application is related to integrated circuits and more particularly to providing power to integrated circuits.

Description of the Related Art

In applications that include a communications interface, a separate power management integrated circuit may interact with an integrated circuit including a transceiver and may control which portions of the system receive power. The power management integrated circuit may be coupled to various power sources and may convert power received from those power sources to forms for use by other circuits in the system. Conventional power management integrated circuit use timed events to sequentially power portions of the system. Other conventional power management integrated circuits receive commands from a microcontroller that cause the conventional power management integrated circuit to sequentially power up portions of the system. However, finer power control may be desired in some applications.

SUMMARY OF EMBODIMENTS OF THE INVENTION

In at least one embodiment, an integrated circuit product includes an integrated circuit including an integrated circuit interface, a wireless communications circuit, a selection circuit, and a control circuit. The integrated circuit interface includes a plurality of power supply input terminals, a plurality of power delivery terminals, and an energy harvest output terminal. The wireless communications circuit is configured to harvest energy received in a wireless communications signal and to provide harvested energy to the energy harvest output terminal. The selection circuit is coupled to the integrated circuit interface and is configured to selectively provide power to the plurality of power delivery terminals based on power received from the plurality of power supply input terminals in response to a control signal. The control circuit is configured to generate the control signal based on a first level of the harvested energy, any signals received on the plurality of power supply input terminals, and predetermined rules. The integrated circuit may include a communications interface coupled to the wireless communications circuit and the control circuit. The communications interface may be configured to communicate between the integrated circuit and a controller unit. The predetermined rules may include transitioning a power state of the integrated circuit in response to a first level of available power exceeding a first predetermined power level and the first level of available power being less than a second predetermined power level.

In at least one embodiment of the invention, a method for operating an integrated circuit system includes selectively providing power to at least one power supply delivery terminal of a plurality of power delivery terminals based on power received from at least one power supply input terminal of a plurality of power supply input terminals in response to a control signal. The method includes generating the control signal by a control circuit based on a first level of harvested energy harvested from a wireless communications signal received by a wireless communications circuit, any power received on the plurality of power supply input terminals, and predetermined rules. The method may include waking the control circuit from an unpowered state in response to receiving a wireless communication signal, harvesting power from the wireless communications signal, storing the harvested power in a reservoir coupled to the energy harvest output terminal, and receiving power from the reservoir using a power supply input terminal.

In at least one embodiment of the invention, an integrated circuit system includes a plurality of power supply input terminals, a storage element, and a processor. The processor is configured to execute instructions stored in the storage element. The instructions are executable by the processor to cause the processor to generate a control signal based on a first level of harvested energy harvested from a wireless communications signal received by a wireless communications circuit, any power received on the plurality of power supply input terminals, and predetermined rules. The integrated circuit system may include a wireless communications circuit configured to harvest energy from the wireless communications signal. The integrated circuit system may include a controller unit coupled to a corresponding power delivery terminal of the plurality of power delivery terminals. The wireless communication circuit may be configured to access non-volatile memory while the controller unit is powered off based on a communication received via the wireless communications circuit.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

An integrated circuit implements functions that are typically performed by a power management integrated circuit (PMIC) and functions that are typically performed by a separate near field communications (NFC) integrated circuit or radio frequency identification (RFID) integrated circuit. Integration of that functionality facilitates cooperation of those control functions with a smaller footprint, fewer pins and traces on a printed circuit board or other substrate, and thus, reduced application costs.

Figure 1:
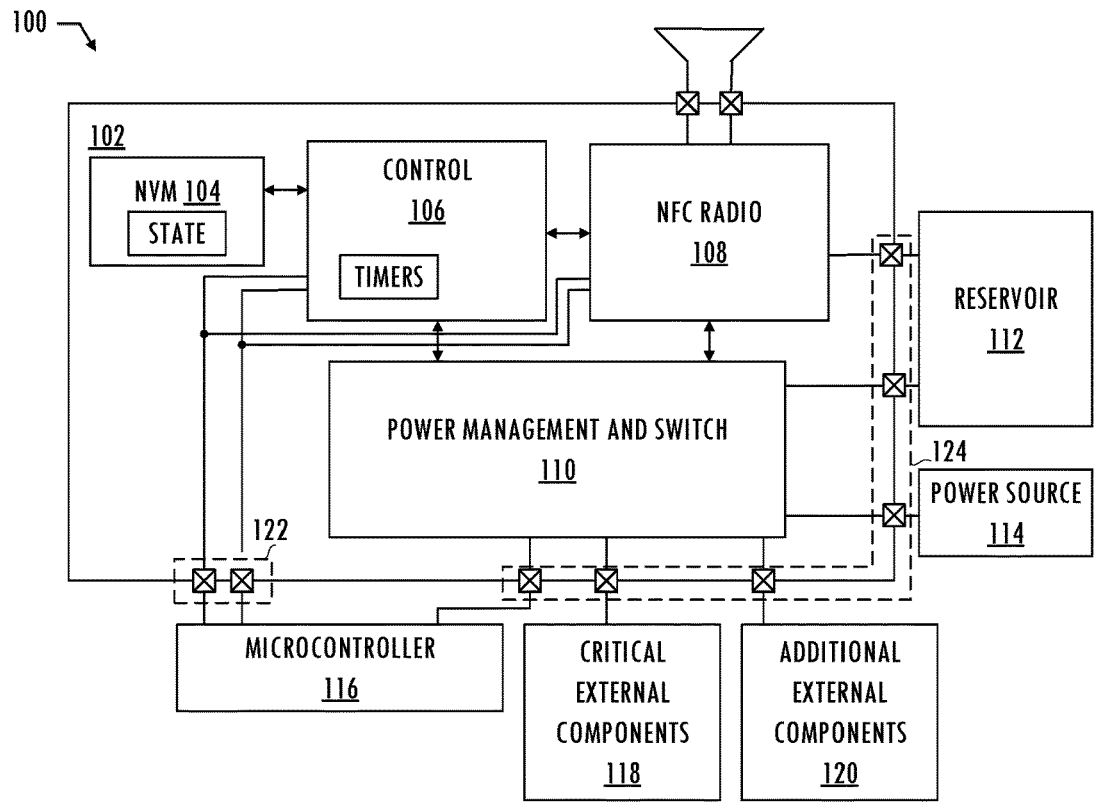
FIG. 1 illustrates a functional block diagram of a near field communications and power management integrated circuit including non-volatile memory consistent with at least one embodiment of the invention.

Referring to FIG. 1, system 100 includes near field communications and power management integrated circuit 102 coupled to a passive antenna. Near field communications and power management integrated circuit 102 at least partially includes near field communications functionality, which may include receiving radio-frequency signals, demodulating commands in the received signal, accessing non-volatile memory based on the demodulated commands, modulating data received from the non-volatile memory, and transmitting radio-frequency signals based on the modulated data. In some embodiments, near field communications functionality is partially implemented in microcontroller 116. In at least one embodiment, near field communications radio 108 of near field communications and power management integrated circuit 102 includes at least hardware that receives the radio-frequency signal via the antenna and harvests energy from the received signal.

In at least one embodiment, near field communications and power management integrated circuit 102 includes non-volatile memory 104 that near field communications radio 108 reads or writes in response to a wireless signal received from a near field communications reader device. A near field communications reader device interfacing with near field communications and power management integrated circuit 102 can interact with non-volatile memory 104 on near field communications and power management integrated circuit 102 without powering up microcontroller 116, critical external components 118, or additional external components 120 and without received power over interface 124.

Figure 2:
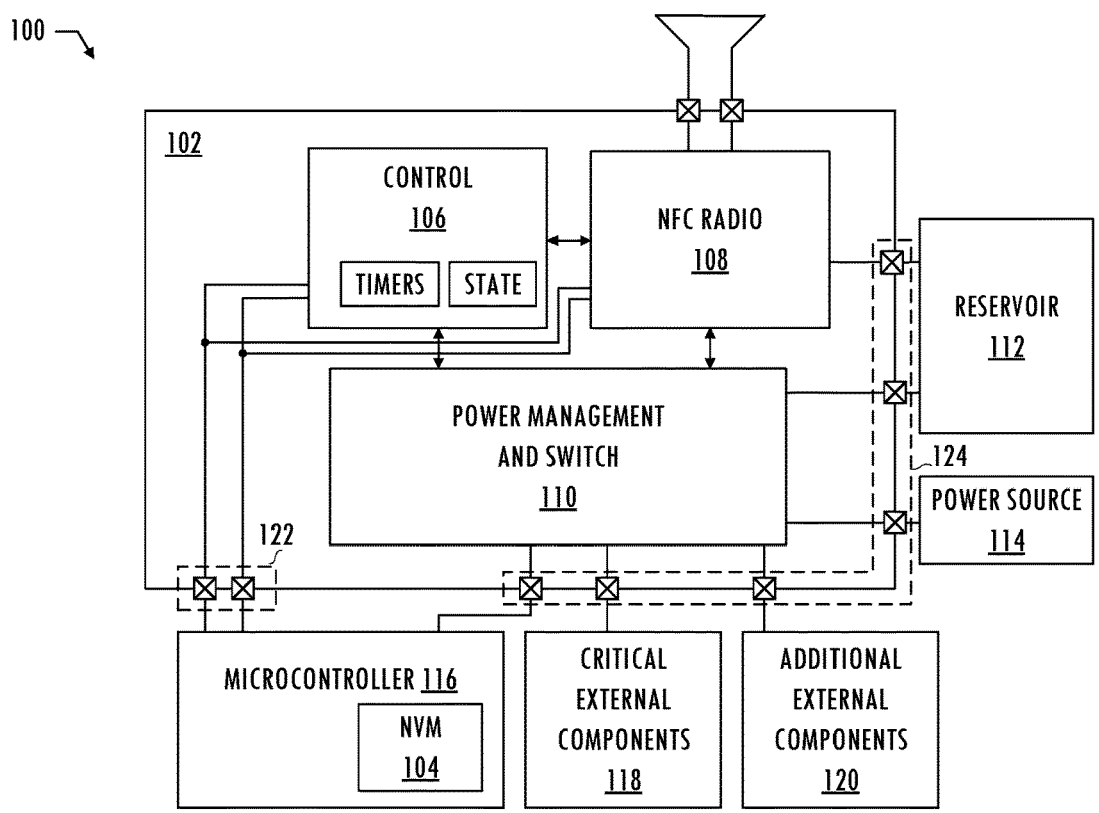
FIG. 2 illustrates a functional block diagram of a near field communications and power management integrated circuit coupled to external non-volatile memory consistent with at least one embodiment of the invention.

Referring to FIG. 2, in other embodiments, near field communications and power management integrated circuit 102 is coupled to an external non-volatile memory 104, which may be included in microcontroller 116 or is otherwise coupled to near field communications and power management integrated circuit 102. The near field communications reader may issue commands that cause near field communications and power management integrated circuit 102 to wake microcontroller 116 without powering additional external components 120 to access data (e.g., log-data on the microcontroller 116). By including non-volatile memory 104 in microcontroller 116, greater quantities of data may be available to the near field communications reader than quantities that may be available in near field communications and power management integrated circuit 102. Embodiments of near field communications and power management integrated circuit 102 that include the non-volatile memory may be lower cost than the embodiments of FIG. 1 since near field communications and power management integrated circuit 102 does not include expensive non-volatile memory (e.g., EEPROM).

Figure 3:
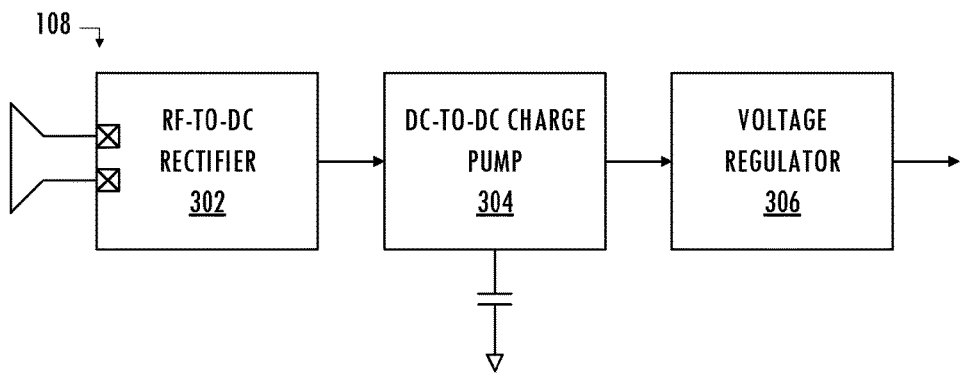
FIG. 3 illustrates a functional block diagram of an energy harvesting portion of an exemplary near field communications radio of FIGS. 1 and 2.

Referring to FIG. 1, near field communications radio 108 may include a transceiver compliant with a near field communications protocol or a radio-frequency identification protocol and a power harvesting circuit. Near field communications radio 108 includes a circuit that converts energy from a received radio frequency signal into an electrical voltage or current. For example, referring to FIG. 3, near field communications radio 108 includes RF-to-DC rectifier 302, which provides a DC signal to DC-to-DC charge pump 304 and voltage regulator 306. Voltage regulator 306 provides an output DC voltage signal that may be used to power other portions of near field communications and power management integrated circuit 102 and/or the output DC signal may be provided to reservoir 112. Reservoir 112 may include an electrochemical double-layer capacitor (i.e., ECDL, electric double-layer capacitor EDCL, pseudocapacitor, supercapacitor, supercap, or ultracapacitor), or other energy storage device.

Referring to FIG. 1, near field communications and power management integrated circuit 102 includes interface 124 having at least one power supply input terminal and at least one power supply output terminal. Each power supply output terminal may be coupled to a corresponding device included for the target application (e.g., microcontroller 116, critical external components 118, and additional external components 120). In embodiments of near field communications and power management integrated circuit 102 that support energy harvesting by near field communications radio 108, interface 124 includes an energy harvest output terminal that delivers power to a reservoir for storage. Thus, near field communications and power management integrated circuit 102 can access and control energy harvested by an energy harvesting circuit of near field communications radio 108.

Figure 4:
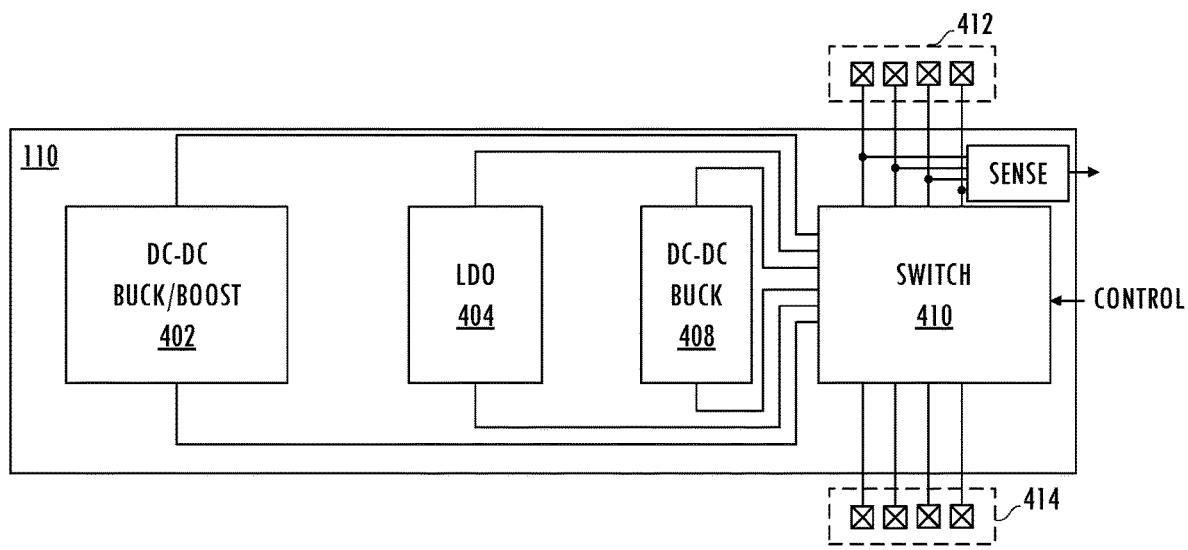
FIG. 4 illustrates a functional block diagram of an exemplary power management and switch circuit of FIGS. 1 and 2.

Referring to FIGS. 1 and 4, power management and switch 110 provides control 106 with digital signals representing the power level of each external power supply or reservoir coupled to near field communications and power management integrated circuit 102. In at least one embodiment, control 106 uses those digital signals to generate a control signal that configures switching circuits in power management and switch 110 to provide power to at least one of microcontroller 116, critical external components 118, and additional external components 120. If no external power supply or reservoir provides sufficient power or a timer has not yet timed-out, control 106 waits in a low power state or powered-off state for a predetermined event (e.g., sufficient power received from an external supply or reservoir or a time-out signal). Power management and switch 110 includes one or more power converter or voltage regulator, e.g., DC-to-DC buck/boost converter 402, DC-to-DC buck converter 408, and low-dropout regulator 404, to allow dynamic voltage scaling and/or regulation of voltages received from input power supply terminals 412 and provided to power delivery terminals 414, according to target specifications. Power management and switch 110 may receive harvested energy directly from near field communications radio 108 or may receive harvested energy from reservoir 112 via input power supply terminals 412.

Control 106 and power management and switch 110 implement rule-based conditions that evaluate external power conditions and cause system 100 to transition between power states based on that information. Power management and switch 110 may include sensors that determine a level of available power from near field communications radio 108 or reservoir 112. In addition, power management and switch 110 may sense presence and available power from power source 114 or other additional power supplies (e.g., battery, reservoir, or other power supply) coupled to near field communications and power management integrated circuit 102. Power management and switch 110 provides sensed power level information to control 106, which generates a control signal based on the power level information and predetermined rules. That control signal configures switch 410 to provide power to one or more of power delivery terminals 414 based on power received from input power supply terminals 412.

Referring to FIGS. 1 and 2, control 106 and near field communications radio 108 each may communicate with external microcontroller 116 via communications interface 122. Communications interface 112 may implement an inter-integrated circuit (I²C) serial communications protocol, serial peripheral interface bus (SPI), or other serial or parallel interface implementing another communications protocol. Near field communications radio 108 and control 106 share communications interface 122, thus reducing cost of near field communications and power management integrated circuit 102 as compared to solutions that include separate integrated circuit die for near field communications and power management functions.

Figure 5:
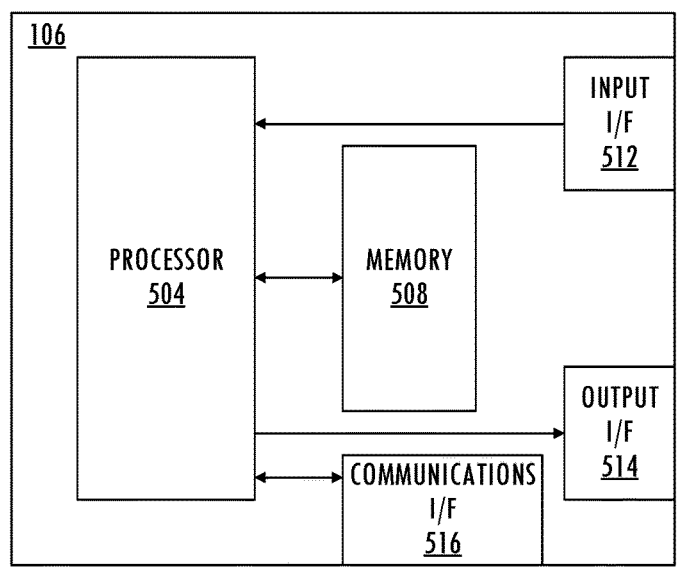
FIG. 5 illustrates a functional block diagram of an exemplary control circuit of FIGS. 1 and 2.

Referring to FIG. 5, in at least one embodiment, control circuit 106 includes general purpose processor 504, which is configured to execute instructions stored in memory 508 based on inputs received from input interface 512 and provides output control signals using output interface 514. Control circuit 106 also includes communications interface 516 implementing a communications protocol compatible with communications interface 122 for communicating with an external microcontroller. In other embodiments, control circuit 106 includes custom-designed logic to implement the functions described herein. Input interface 512 and output interface 514 are coupled to near field communications radio 108 and non-volatile memory 104. In at least one embodiment, input interface 512 and output interface 514 are coupled to receive sensor measurements directly from external power source 114, reservoir 112, or other circuit or from external power source 114, reservoir 112, or other circuit via power management and switch 110.

Referring to FIGS. 1 and 2, near field communications and power management integrated circuit 102 has increased control over power states than implementations that use separate integrated circuit die for near field communications and power management functions. Near field communications and power management integrated circuit 102 need not be coupled to a battery or other power supply for control 106 to manage available system power. Since control 106 has access to information detected and/or sensed by power management and switch 110 in addition to power levels received by near field communications radio 108, control 106 can dynamically adapt a system configuration, e.g., according to power levels and changes to presence or absence of power supplies coupled to interface 124. An embodiment of control 106 dynamically adapts the system configuration by applying predetermined states and rules for transitions to that information. Another embodiment of control 106 dynamically adapts the system configuration by applying timers with predetermined delays to that information.

System 100 is segmented into various power domains that are enabled during corresponding power states. For example, a passive power domain includes circuits enabled in a passive power state, a critical power domain includes circuits enabled in a critical power state, and all circuits of system 100 receive power in a full-power state. The passive power domain provides power to only circuits within near field communications radio 108 that are used to access non-volatile memory 104 and to any other circuits that are external to near field communications radio 108 and are required to read or write non-volatile memory 104. If non-volatile memory 104 is included in near field communications and power management integrated circuit 102, non-volatile memory 104 can be accessed in the passive power state. Transitions between power states need not be sequential. Rather, a power state may transition to another power state if control 106 detects that the available power is sufficient to support a higher power state or that the available power is insufficient to support a current power state. If sensor signals indicate that the available power is above a first threshold level, but less than a second threshold level, then control circuit 106 configures power management and switch 110 to provide power to circuits included in a critical domain only. In an embodiment, the critical power domain only includes critical external components 118 or other user-defined set of components in system 100. An embodiment of the critical power domain includes microcontroller 116 and/or other critical external components 118 that are needed to operate in a critical power state. An embodiment implements multiple critical power domains having different levels of critical components. If non-volatile memory 104 is included in external components 118 or in microcontroller 116, then non-volatile memory 104 may not be accessible in the passive power state and only become accessible in the critical power state or full-power state.

Figure 6:
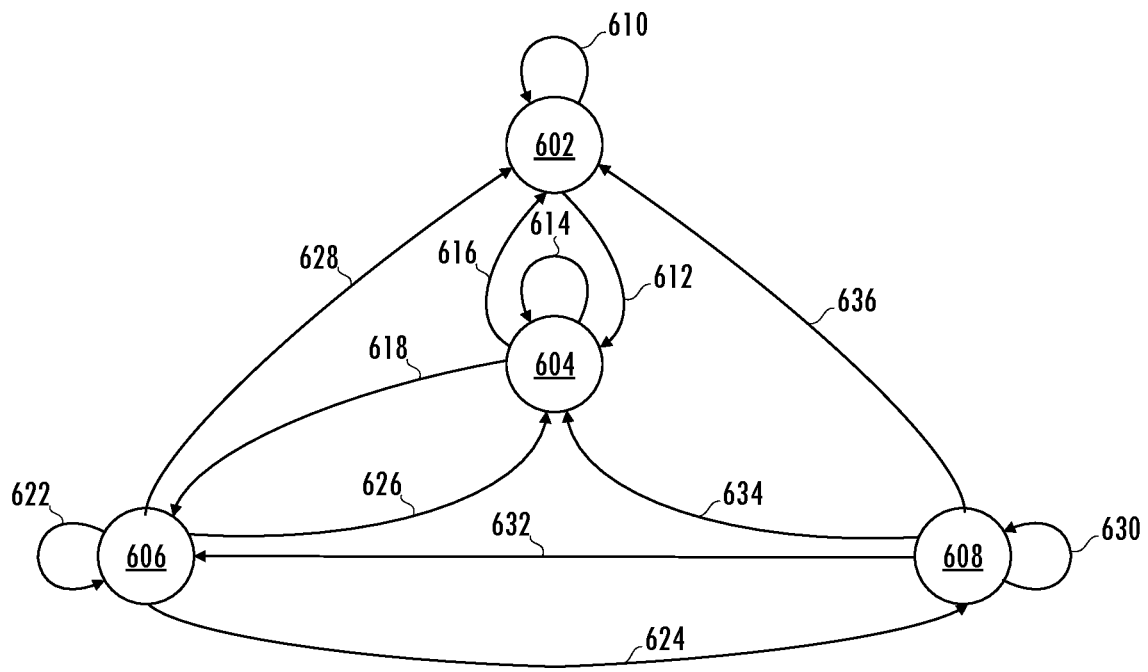
FIGS. 6 and 7 illustrate exemplary states and state transitions of the near field communications and power management integrated circuit FIGS. 1 and 2.

Referring to FIGS. 1 and 6, near field communications and power management integrated circuit 102 controls which portion of system 100 has access to available energy, including any harvested energy, based on predefined or dynamic rules. A user may configure the rules during manufacturing or may use microcontroller 116 to configure or reconfigure the rules after manufacture. In an exemplary embodiment, system 100 is initially configured in powered-off state 602 and stays in powered-off state while near field communications radio 108 fails to receive a near field communications signal (610). If near field communications radio 108 receives a communications signal, near field communications and power management integrated circuit 102 transitions system 100 to passive state 604 (612). In passive state 604, near field communications radio 108 may read non-volatile memory 104 and transmit data to a near field communications reader or may write non-volatile memory 104 in response to a received communications signal. While in passive state 604, if the available power level is below a first available power threshold level, near field communications and power management integrated circuit 102 maintains system 100 in passive state 604 (614). If near field communications cease while system 100 is in passive state 604, near field communications and power management integrated circuit 102 maintains system 100 in passive state 604 until depletion of any harvested energy. In response to any harvested energy being depleted, near field communications and power management integrated circuit 102 returns system 100 to powered-off state 602 (616). While system 100 is in passive state 604, near field communications radio 108 may accumulate sufficient energy on-chip or in reservoir 112 that exceeds the first available power threshold level to cause near field communications radio 108 to wake control 106 and power management and switch 110 to cause system 100 to enter critical power state 606 (618).

In an embodiment of system 100, during critical power state 606, power management and switch 110 senses any available power being received by power supply input terminals. In addition, reservoir 112 may accumulate power that is harvested by near field communications radio 108. Power management and switch 110 provides information regarding detected power supplies and/or available power from external power supplies and reservoir 112 to control 106. If control 106 determines that the available power level exceeds a second available power threshold level, then control 106 configures power management and switch 110 to provide power to additional components (e.g., additional external components 120 or any additional internal components) and system 100 enters full-power state 608 (624). However, until control 106 determines that the available power level exceeds a first available power threshold level, system 100 remains in the critical power state 606 (622).

While in critical power state 606, if control 106 determines that the available power level cannot sustain critical power state 606, then control 106 disables critical external components. Control 106 causes system 100 to return to the passive power state 604 if near field communications radio 108 is receiving a communication (626) or causes system 100 to return to the powered-off state 602 in the absence of a received communication (628).

In full-power state 608, if control 106 determines that the available power level is above the second available power threshold level, then control 106 configures power management and switch 110 to maintain power to the additional components (additional external components 120 and any additional internal components) and system 100 remains in full-power state 608 (630). In full-power state 608, if the available power level falls below a third available power threshold level, but remains above a fourth available power threshold level, then control 106 configures power management and switch 110 to return to critical power state 606 (632). In a full-power state 608, if the available power falls below the fourth threshold, but near field communications radio 108 is receiving a communication, then control 106 configures power management and switch 110 to return to passive power state 604 (634). In full-power state 608, if the available power falls below the fourth threshold, and near field communications radio 108 is not receiving a communication, then control 106 powers off circuitry and the system enters powered-off state 602 (636).

In an embodiment of system 100, microcontroller 116 receives an indication from near field communications and power management integrated circuit 102 that it is ready to operate in full-power state 608. In response, microcontroller 116 provides a control signal to near field communications and power management integrated circuit 102 to cause system 100 to enter full-power state 608 at a suitable time. Near field communications and power management integrated circuit 102 automatically triggers at least some of transitions 610, 612, 614, 616, 618, 622, 624, 626, 628, 630, 632, 634, and 636 and microcontroller 116 triggers others of those transitions via communications interface 122.

Note that the states and predetermined rules associated with transitions of FIG. 6 are exemplary only. Control 106 may cause system 100 to enter other states having different configurations of circuits receiving power. Additional states, power domains, and predetermined rules may be implemented. For example, system 100 may also include at least one intermediate power state between the critical power state and the full-power state that provides power to critical circuits and at least one additional circuit, but less then all circuits of system 100. If near field communications radio 108 provides the only power in system 100, then system 100 may operate in a passive power state 604 until reservoir 112 accumulates sufficient power to power the circuits included in the critical power domain, which includes at least a portion of control 106.

Figure 7:
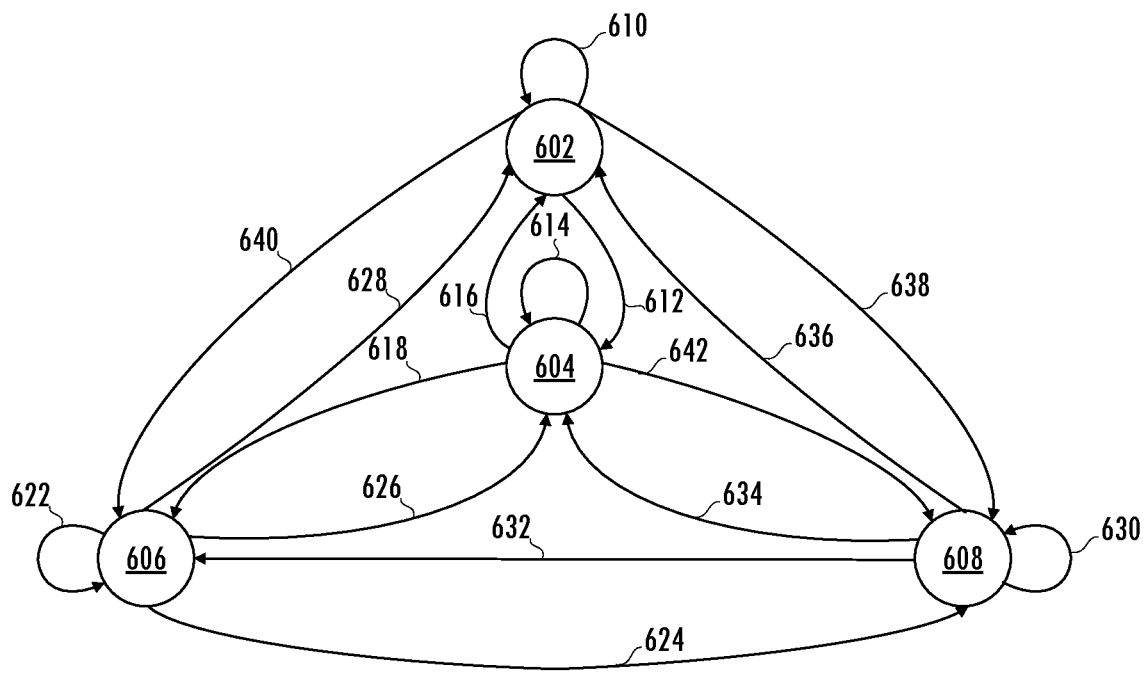

In at least one embodiment, power management and switch 110 may wake system 100 into states other than passive power state 604. For example, referring to FIG. 7, in other embodiments of system 100, in addition to transitions described above, near field communications and power management integrated circuit 102 may also be configured to wake system 100 from powered-off state 602 to directly enter critical power state 606 (640) or full-power state 608 (638) in response to a corresponding external power source being coupled to a power supply input terminal and providing sufficient power to power management and switch 110, which directly powers control 106. Similarly, near field communications and power management integrated circuit 102 may also be configured to transition from passive state 604 directly into full power state 608 based on power levels sensed by power management and switch 110 (642).

Thus, embodiments of a near field communications and power management integrated circuit have been described. The near field communications and power management integrated circuit may be incorporated into energy-friendly power devices for an increased level of integration and fine control of power delivery to components in an Internet of Things (IoT) application. The near field communications and power management integrated circuit reduces bill of materials and increases control over power states of an associated system. In an application that typically consumes more current than the near field communications radio can harvest, the near field communications and power management integrated circuit provides power only to critical components to stay within the available power generated by the near field communications connection where a communications signal received by the near field communications radio 108 is the only source of power.

In at least one embodiment, near field communications and power management integrated circuit 102 includes additional circuitry that may otherwise be included in a target application as separate integrated circuits. For example, near field communications and power management integrated circuit 102 may include, e.g., segment LCD display drivers, additional energy harvesting circuitry, or other circuits used by the target application. Integration of additional energy harvesting circuitry allows centralized management of those additional resources.

The description of the invention set forth herein is illustrative and is not intended to limit the scope of the invention as set forth in the following claims. For example, while the invention has been described in an embodiment in which a radio compliant with near field communications protocols or radio frequency identification protocols are used, one of skill in the art will appreciate that the teachings herein can be utilized with other communications protocols for different communications ranges may be used. Variations and modifications of the embodiments disclosed herein, may be made based on the description set forth herein, without departing from the scope of the invention as set forth in the following claims.

What is claimed is:

1. An integrated circuit product comprising:
    an integrated circuit comprising:
        an integrated circuit interface comprising a plurality of power supply input terminals, a plurality of power delivery terminals, and an energy harvest output terminal;
        a wireless communications circuit configured to harvest energy received in a wireless communications signal and to provide harvested energy to the energy harvest output terminal;
        a selection circuit coupled to the integrated circuit interface and configured to selectively provide power to the plurality of power delivery terminals based on power received from the plurality of power supply input terminals in response to a control signal; and
        a control circuit configured to generate the control signal based on a first level of the harvested energy, any signals received on the plurality of power supply input terminals, and predetermined rules, wherein the control circuit configures the selection circuit to provide power to a first set of circuits of a first power domain based on a first predetermined event of the predetermined rules, wherein the control circuit configures the selection circuit to provide power to a second set of circuits of a second power domain based on a second predetermined event of the predetermined rules, and wherein the control circuit configures the selection circuit to provide power to a third set of circuits of a third power domain based on a third predetermined event of the predetermined rules.

2. The integrated circuit product, as recited in claim 1, further comprising:

a reservoir configured to receive the harvested energy from the energy harvest output terminal, to store the harvested energy, and to deliver power to a corresponding power supply input terminal of the plurality of power supply input terminals, wherein the selection circuit receives power from the reservoir via the corresponding power supply input terminal.

3. The integrated circuit product, as recited in claim 1, further comprising:

a controller unit coupled to a corresponding power delivery terminal of the plurality of power delivery terminals, wherein the integrated circuit further comprises a non-volatile memory, and wherein the wireless communications circuit is configured to access the non-volatile memory while the controller unit is powered off.

4. The integrated circuit product, as recited in claim 3, wherein the integrated circuit further comprises:

a communications interface coupled to the wireless communications circuit and the control circuit, the communications interface being configured to communicate between the integrated circuit and the controller unit.

5. The integrated circuit product, as recited in claim 3, further comprising:

a component coupled to a second corresponding power delivery terminal of the plurality of power delivery terminals.

6. The integrated circuit product, as recited in claim 1, further comprising:

a secondary power source coupled to a power supply input terminal of the plurality of power supply input terminals, wherein the control circuit is configured to monitor a power level of the secondary power source.

7. The integrated circuit product, as recited in claim 1, wherein the wireless communications signal comprises signals having frequencies in a Radio-Frequency Identification (RFID) frequency band and the wireless communications circuit detects the wireless communications signal in a near field region.

8. The integrated circuit product, as recited in claim 1, wherein the predetermined rules include transitioning a power state of the integrated circuit in response to a first level of available power exceeding a first predetermined power level and the first level of available power being less than a second predetermined power level.

9. A method for operating an integrated circuit system comprising:

selectively providing power to at least one power supply delivery terminal of a plurality of power delivery terminals based on power received from at least one power supply input terminal of a plurality of power supply input terminals in response to a control signal; and generating the control signal by a control circuit based on a first level of harvested energy harvested from a wireless communications signal received by a wireless communications circuit, any power received on the plurality of power supply input terminals, and predetermined rules, wherein power is selectively provided to a first set of circuits of a first power domain based on a first predetermined event of the predetermined rules, wherein power is selectively provided to a second set of circuits of a second power domain based on a second predetermined event of the predetermined rules, and wherein power is selectively provided to a third set of circuits of a third power domain based on a third predetermined event of the predetermined rules.

10. The method, as recited in claim 9, wherein the selectively providing power includes providing power to a first power delivery terminal of the plurality of power delivery terminals, the first power delivery terminal being coupled to a controller unit, the method further comprising:

waking the controller unit from an unpowered state; and communicating with the controller unit by the wireless communications circuit and the control circuit using a shared communications interface.

11. The method, as recited in claim 9, further comprising:

waking the control circuit from an unpowered state in response to receiving the wireless communication signal;

harvesting power from the wireless communications signal;

storing the harvested power in a reservoir coupled to an energy harvest output terminal; and receiving power from the reservoir using a power supply input terminal of the plurality of power supply input terminals.

12. The method, as recited in claim 11, further comprising:

communicating a power level of the reservoir and presence of any signals received on the plurality of power supply input terminals externally to the integrated circuit system.

13. The method, as recited in claim 11, wherein the first predetermined event includes a power level of the reservoir and any signals received on the plurality of power supply input terminals exceeding a first threshold power level and being below a second threshold power level.

14. The method, as recited in claim 13, wherein the second predetermined event includes the power level of the reservoir and any signals received on the plurality of power supply input terminals exceeding the second threshold power level and being below a third threshold power level.

15. The method, as recited in claim 14, wherein the second predetermined event includes the power level of the reservoir and any signals received on the plurality of power supply input terminals exceeding the third threshold power level.

16. The method, as recited in claim 9, further comprising:

accessing a non-volatile memory while a controller unit is powered off.

17. An integrated circuit system comprising:
a plurality of power supply input terminals;
a plurality of power delivery terminals;
a storage element;
a switching circuit responsive to a control signal to couple a reservoir or a secondary power source to provide power using the plurality of power supply input terminals and the plurality of power delivery terminals; and
a processor configured to execute instructions stored in the storage element, the instructions being executable by the processor to cause the processor to:
generate the control signal based on a first level of harvested energy harvested from a wireless communications signal received by a wireless communications circuit, any power received on the plurality of power supply input terminals, and predetermined rules,
wherein the control signal configures the switching circuit to provide power to a first set of circuits of a first power domain based on a first predetermined event of the predetermined rules,
wherein the control signal configures the switching circuit to provide power to a second set of circuits of a second power domain based on a second predetermined event of the predetermined rules, and
wherein the control signal configures the switching circuit to provide power to a third set of circuits of a third power domain based on a third predetermined event of the predetermined rules.

18. The integrated circuit system, as recited in claim 17, further comprising:
the reservoir; and
the secondary power source,
wherein the first set of circuits includes circuits within the wireless communications circuit that are used to access a non-volatile memory, and
wherein the second set of circuits includes an external controller unit.

19. The integrated circuit system, as recited in claim 18, further comprising:
the wireless communications circuit configured to harvest energy from the wireless communications signal,
wherein the external controller unit is coupled to a corresponding power delivery terminal of the plurality of power delivery terminals,
wherein the wireless communication circuit is configured to access non-volatile memory while the external controller unit is powered off based on a communication received via the wireless communications circuit.

* * * * *